United States Patent
Beverly

[15] 3,664,053
[45] May 23, 1972

[54] MULTIPURPOSE BOBBER

[72] Inventor: Rheinhardt J. Beverly, 4602 East 14th St., Tucson, Ariz. 85711

[22] Filed: May 7, 1970

[21] Appl. No.: 35,515

[52] U.S. Cl..............................43/43.14, 43/44.95, 43/43.15
[51] Int. Cl...................................A01k 93/00, A01k 91/00
[58] Field of Search ...............43/43.14, 42.35, 42.36, 42.49, 43/44.95, 44.9, 44.91, 43.15

[56] References Cited

UNITED STATES PATENTS

| | | | |
|---|---|---|---|
| 2,908,992 | 10/1959 | Isbell | 43/44.95 |
| 2,694,844 | 11/1954 | Grumbach | 43/44.95 UX |
| 2,706,359 | 4/1955 | Beames | 43/42.35 |
| 2,758,410 | 8/1956 | Cowsert | 43/43.14 |
| 3,114,984 | 12/1963 | Atton | 43/43.15 |

Primary Examiner—Melvin D. Rein
Attorney—Clarence A. O'Brien and Harvey B. Jacobson

[57] ABSTRACT

A multipurpose bobber comprising a hollow body of suitable size and shape and made of squeezable self-shape restoring material similar to that which is currently used in making squeezable plastic bottles, squeeze-bulbs and the like. It can be charged with water to vary its relative buoyancy. It has suitably aligned stoppers operatively mounted in its opposite ends. An enclosed stiff wire or rod has hooks at its ends and when the median portion of the body is squeezed both hooked ends of the rod are caused to project in a manner that the bobber can be (1) hooked on a line attaching, line running ring or (2) clenched retentively over longitudinally spaced portions of the line itself to provide a regular bobber.

5 Claims, 6 Drawing Figures

Patented May 23, 1972
3,664,053
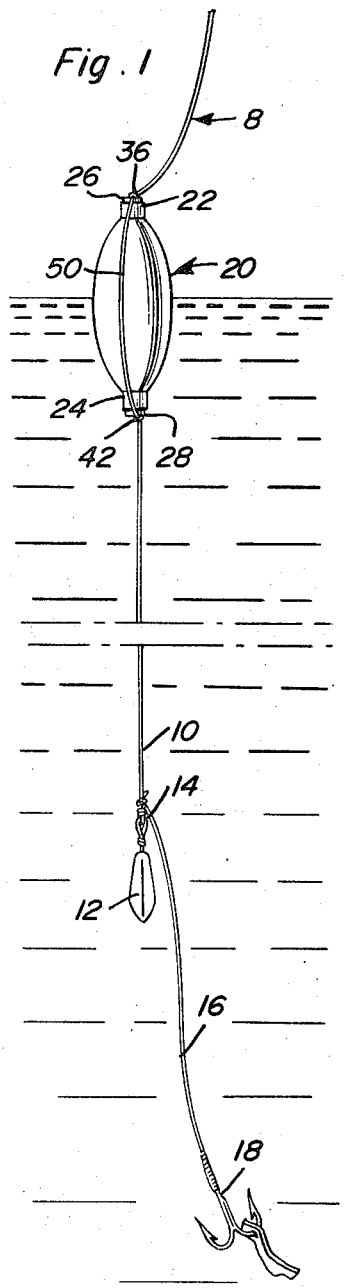
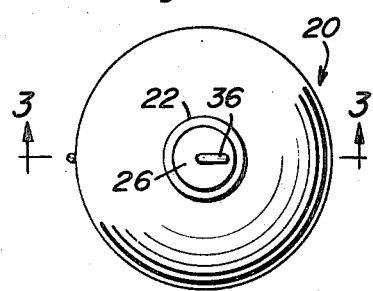
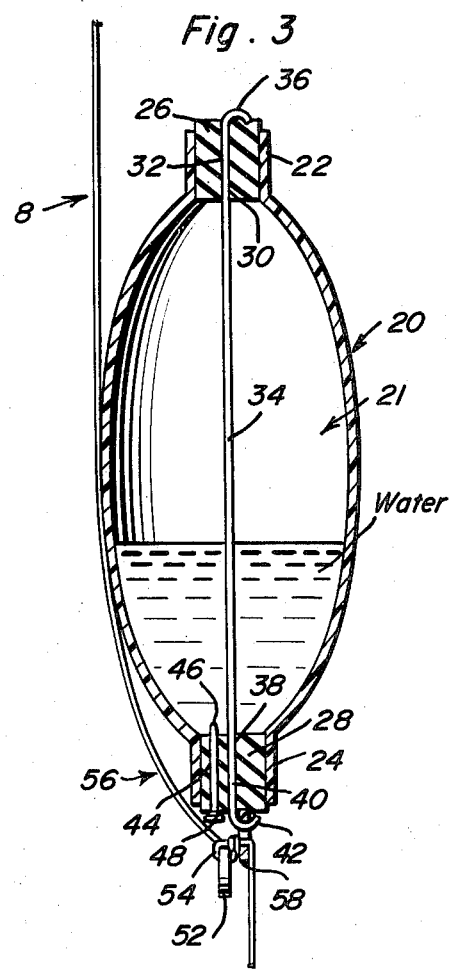
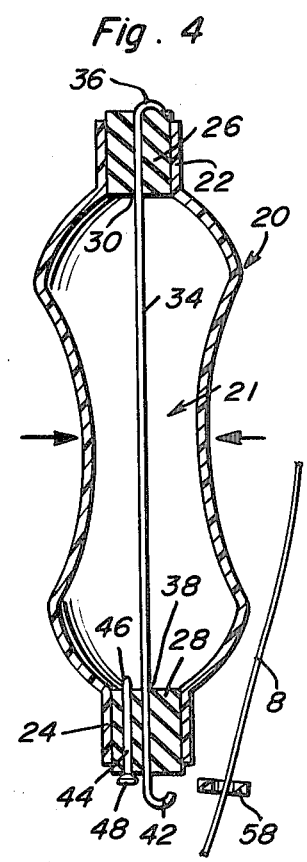
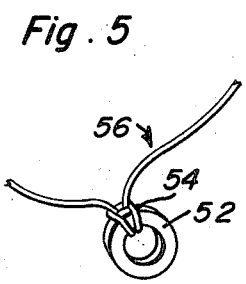
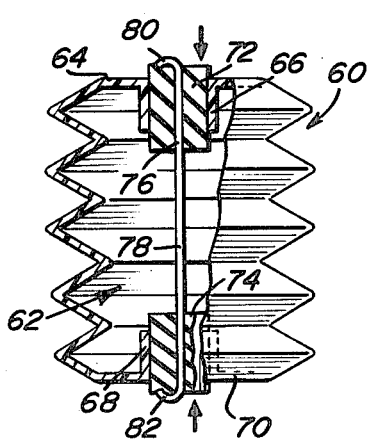
Rheinhart J. Beverly
INVENTOR.
BY Clarence A. O'Brien
and Harvey B. Jacobson
Attorneys

MULTIPURPOSE BOBBER

This invention relates to line attached accessories such as bobbers and sinkers and has to do, more particularly, with a novel multipurpose substantially unbreakable bobber which can be properly classified and utilized as a running bobber, a regular floating bobber, a water-weighted bobber, or sinking bobber, as varying fishing requirements call for.

More specifically, the invention pertains to a float or bobber which resembles any one of the commonly used floats and bobbers, that is, from a standpoint of general appearance but is structurally distinct and different in that it is equipped with unique self-contained means through the medium of which one or both end portions of the bobber can be selectively, quickly and reliably attached to a predetermined portion of the line or, if preferred, attached to a relatively small flat-faced ring (or equivalent means) through which a coacting portion of the line can be slidingly passed for such fishing purposes as may be desired.

Briefly a significant aspect of the invention pertains to a suitably shaped hollow body which is made of manually squeezable resilient rubber or compressible resilient plastic material. This body has readily accessible and usable means at its respectively opposite ends which is designed and adapted to be detachably and also adjustably connected to a predetermined portion of the fishing line. This bobber attaching means is movable relative to the respective ends of the bobber when the body is manually squeezed, whereby the means can be extended and opened and subsequently forcibly closed to facilitate attachment of the bobber to the line at the place desired.

Another and equally important aspect of the concept comprehends the use of a fishing line which has its lower end provided with an attached sinker. A portion of the line above the sinker is equipped with a limit stop ring, more particularly, a ring which is adjustably hitched on a portion of the line at a point spaced a predetermined distance from and above the sinker. A second ring similar to the first-named limit stop ring is also provided and has an opening through which that portion of the line downwardly of the adjustably attached first limit stop ring is freely slidable. The bobber, which in and of itself is novel, is provided at its opposite ends with means, for example, projectable and retractable hooks, one of which is detachably connectible with the second-named ring. This running bobber can slide down the line to the attached sinker without fouling up on the fishing hook.

As will be hereinafter clarified two embodiments of bobbers are disclosed, one of which is elongated (but may be round) and the other one of which is bellows-like or accordion-like in appearance. The first named form can be squeezed in the middle and the second one, the accordion-type, can be compressed by applying squeezing pressure against the flat top and bottom ends. When the applied pressure is released the bobber, because of its inherent memory properties, automatically resumes its original expanded shape. It will be evident that when squeezed and compressed the bobber gets shorter. This shortening of the bobber and simultaneous exposing of the bill portions of the line attaching hooks is a significant feature of the invention.

Either one or both bobbers is characterized by simple easy-to-operate valving means, for instance, a headed nail or pin which is accessibly and operatively mounted in a venting hole provided in one of the cork or equivalent stoppers. It follows that when the bobber is intentionally placed under water, squeezed and allowed to resume its given normal or original shape, water is siphoned into the hollow chamber and a weighted bobber is thus provided. The pin is replaced to close the inlet-outlet vent. Manifestly, this change-of-buoyancy feature can be achieved by installing the valve means (not shown) at some other place on the bobber.

Another important feature of the invention has to do with axially aligned cork or similar stoppers which are mounted in any suitably accepted manner in the end portions of the bobber and have open-ended guide bores through and beyond which coacting hooked ends of an enclosed wire or rod are slidable. When pressure is applied the bobber is reduced in length and the attaching hooks at the ends stand out and are fully available to receive the line or a ring as, the case may be.

Then, too, it will be noted that two rings of identical size are employed. One ring, a limit stop ring, is detachably and adjustably hitched (by a half-hitch) on the line at a prescribed place. The other ring is shiftable on the line and can be hooked to one end of the bobber. The fishing line runs through the last named ring and is now a running or sliding bobber and will slide up the line until it reaches and is checked by the limit stop ring.

A further feature of the invention believed to be meritorious is that the two rings hereinafter provided are not only alike but are such in size that they will not stop at the end of the angling rod or pole but are small enough that they go on through to the reel. In fact, experience has shown that these rings will flip around and not catch on any obstruction. Most running bobbers are such that the line runs completely through the bobber. Often the wet line going through a small bore encounters friction-drag and, unless a heavy sinker is used, the desired free running action is not achieved.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in elevation showing the fishing line attached to the hook-equipped ends of the bobber and providing a so-called regular line-attached bobber.

FIG. 2 is a top plan view of the bobber by itself on a suitably enlarged scale and with the fishing line omitted.

FIG. 3 is a view on a suitably enlarged scale with parts in section and elevation taken on the plane of the section line 3—3 of FIG. 2 and showing both rings, one of which is adjustably hitched on the fishing line and the second one clenched to the bottom hook of the bobber to provide the desired running float, and also showing the bobber partially charged with weighting water.

FIG. 4 is a view similar to FIG. 3 with the water omitted, with the median portion of the bobber squeezed in a manner to shorten the same, and also wherein one of the free sliding rings on the line is readied for attachment to the projected lower hook.

FIG. 5 is a fragmentary perspective view showing a limited portion of the line and one manner in which the limit stop ring is hitched to the line for depth-controlled fishing.

FIG. 6 is a view in section and elevation showing a modified form of the invention, that is, wherein the bobber is bellows-like or accordion shape in form.

By way of introduction to the description of the details it may well be set forth that one embodiment of the over-all concept is comprehended in FIGS. 1–4, inclusive, wherein manual squeezing pressure is applied (FIG. 4) to the central or median portion of the bulbous bobber. Alternatively, the accordion or bellows type bobber or bulb is squeezed by hand but the finger is simultaneously applied to the substantially flat top and bottom ends as is believed to be evident from FIG. 6.

With reference first to FIGS. 1 to 4 inclusive and more particularly to FIG. 1 it will be noted that the fishing line, which is ordinary, is denoted by the numeral 8 and has a submerged lower end portion 10 provided with a terminally attached commonly used sinker 12. That portion just above the locale of the sinker has an end portion 14 of a leader 16 attached thereto, the lower free end of the leader being provided with a suitable fish hook 18. The embodiment of the bobber or float under consideration here is denoted by the numeral 20. This bobber is made of appropriate compressibly resilient rubber or plastic material which is normally expanded and assumes the bulbous shape illustrated. It will be understood that while the bobber illustrated is of elongated ovate form it can and will vary in configuration, size and material. The respective axially aligned end portions of the hollow bobber are provided with outstanding adapter necks 22 and 24 into which cork or equivalent stoppers 26 and 28 are plugged and retained as best shown in FIGS. 3 and 4. It should be understood that the stoppers can be mounted on the end portions of the bobber in some equivalent manner (not illustrated). The stopper 26 is provided with an open-ended guide bore 38 through which a cooperating end portion 32 of an elongated wire rod 34 is extended. The upper end of the rod is provided with a return bend which constitutes attaching and retaining hook 36 whose bill portion is normally seated in contact with the adjacent end portion of the stopper. A similar adaptation and arrangement is provided at the bottom in FIGS. 3 and 4 wherein it will be noted that the lower stopper 28 also has a guide bore 38 extending therethrough. This guide bore serves to accommodate an end portion 40 of the aforementioned wire rod which is slidingly mounted and also terminates in a hook 42 whose bill portion is cooperable with the adjacent surface of the stopper 28. An eccentric passage 44 is provided in the stopper 28 and constitutes a vent for the valve pin 46. This pin is of requisite length and is removably frictionally fitted in the vent and has an accessible headed end 48.

FIG. 1 shows an ordinary adjustable but line attached bobber arrangement wherein a portion 50 of the fishing line spans the exterior convex surface of the bobber. Longitudinally spaced end portions of the line are retentively but releasably connected with the respective upper and lower hooks 36 and 42. As is evident, this is a double-ended bobber, being made of requisite compressibly resilient rubber or suitable plastic material can be manually gripped and squeezed in the middle in the manner shown in FIG. 4, it being obvious that when the pressure is released it will again retain its original or given shape shown in FIGS. 1 and 3. When squeezed in the center the bobber is shortened as evident in FIG. 4 and the respective hooks 36 and 42 are projected in a manner to permit the coacting portions of the line to be attached and clenched in place in the manner shown in FIG. 1. Accordingly, the bobber is kept from sliding along the line in a self-evident manner.

When it is desired to wholly or partially charge the hollow portion or chamber 21 of the bobber with water the head 48 of the pin 46 is caught hold of and the pin is withdrawn to open the vent 44. When the bobber is placed under water, squeezed and allowed to retain its original shape and with water in the bobber it becomes a weighted bobber. The pin (nail or equivalent member) is replaced allowing no water to flow in or out. It is to be pointed out here that the valving means need not necessarily be located in the stopper 28 but can be otherwise mounted and arranged (not detailed) for filling and emptying and weight producing purposes.

It will also be evident that when the bobber is fully inflated as in FIGS. 1, 2 and 3, the bill portions of the respective hooks fit tightly and snugly against the coacting surfaces of the rubber, cork or equivalent end mounted stoppers thus achieving the result illustrated in FIG. 1 in particular.

The fishing like, when rigged in the manner illustrated in FIG. 1 constitutes the aforementioned regular bobber or float and enables the user to predetermine and maintain the depth at which the fishing is to be done.

The manner in which the bobber is associated with the line to achieve the free running effect is evident from FIGS. 3, 4 and 5. One of the aforementioned two rings is denoted by the numeral 52 and is detachably and adjustably connected by a half-hitch 54 to that portion of the line designated at 56 in FIG. 5. This ring 52 constitutes the aforementioned limit stop ring and can be attached wherever desired on the line. This ring is cooperable with a second or companion ring 58 which is carried by the line and which is adapted to be releasably attached to the hook 42 in the manner shown particularly in FIG. 3. Here again the bobber has to be squeezed at its medial portion in order to project the hook and to pave the way for the attachment of the line passing ring 58.

With reference now to the modified form of the bobber shown in FIG. 6 it will be evident that this bobber is denoted by the numeral 60 and is of requisite length and cross-sectional dimension and is preferably bellows-like or accordion like in construction. The hollow portion here is denoted by the numeral 62 and the upper flat end 64 is provided with an inwardly directed neck 66 which is in line with a similar neck 68 on the flat bottom side 70. These necks (or equivalent mounting means) serve to position and retain the respective upper and lower stoppers 72 and 74. Each stopper is provided with an open ended guide bore 76 and these guide bores serve to accommodate the coacting slidable end portions of the confined or enclosed wire rod 78. The terminal end portions of the rod are provided with a return bend which constitute projectable and retractable retaining hooks 80 and 82.

In connection with FIG. 6 it will be obvious that the flat end portions are pressed together with the fingers (not shown) in a manner to collapse the bobber and to cause the respective stoppers to move away from the bill portions of the hooks 80 and 82 for purposes of attaching the line either in the manner shown in FIG. 1 or alternatively in the manner illustrated in FIG. 3. It follows that this accordion type bobber can be used in lieu of the bobber illustrated in FIGS. 1 to 4 inclusive.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multipurpose fishing line bobber comprising a hollow body made of manually squeezable compressibly resilient material and having readily accessible and selectively usable means at its ends designed and adapted to be detachably connected to a fishing line, said means being movable relative to said body when the body is squeezed, said body provided at its respective ends with axially aligned adapter necks provided with complemental stoppers, each stopper having a guide bore passing through the inward and outward ends thereof, line attaching means comprising a rigid elongated rod operatively confined in the hollow portion of said body and having outer end portions passing slidingly through and outwardly beyond the coacting guide bores and terminating in accessibly exposed hooks, said hooks having terminal bill portions which are shiftable toward and from end surfaces of the respectively cooperable stoppers, said bill portions being projectable and retractable and the coacting end surfaces of said stoppers being shiftable a nominal distance from said bill portions when said body is grasped by hand, squeezed, and contracted to the shortened length desired.

2. The fishing line attachment defined in claim 1, and wherein one of said stoppers is provided with a second open-ended bore which constitutes an optionally usable vent, and a valving pin fitted removably into and normally closing said vent, said pin having an outer end provided with an accessible finger-gripping head, whereby said pin can be inserted and removed at will.

3. The fishing line attachment defined in and according to claim 1, wherein said body is corrugated, has flat pressure responsive ends, said adapter necks being directed toward each other and projecting axially into said hollow portion.

4. In combination, a fishing line having a lower end provided with an attached sinker, complemental baited leader, a depth regulating limit stop ring detachably and adjustably hitched on a portion of the line at a point spaced a predetermined distance from and above the sinker, a second ring similar to but independent of and oriented for coaction with said limit stop ring and having an opening through which a portion of the line downwardly of the locale of the limit stop ring is slidable and free running, and a hollow bobber made of compressibly resilient manually squeezable plastic material which when squeezed is reduced in length, line attaching means comprising a rigid rod longer than but disposed within the confines of the hollow portion of said bobber, said bobber having stoppers at its respective ends, said stoppers each having an axial open-ended guide bore, the end portions of said rod passing slidingly through and beyond the outer ends of the respectively cooperable guide bores and having selectively usable projectable and retractable hooks, one of which is adapted to be releasably connected with said second-named ring.

5. The combination defined in claim 4, and wherein said body is suitably and controllably valved and can be charged with water, whereby the relative buoyancy may be changed at will.

* * * * *